United States Patent [19]

Arimori

[11] Patent Number: 4,996,601
[45] Date of Patent: Feb. 26, 1991

[54] VARIABLE-DELAY SIGNAL GENERATING APPARATUS FOR DRIVING SOLID-STATE IMAGE PICK-UP DEVICE

[75] Inventor: Iwao Arimori, Nagasaki, Japan

[73] Assignee: Mitsubishi Denki Kabushiki Kaisha, Tokyo, Japan

[21] Appl. No.: 372,818

[22] Filed: Jun. 29, 1989

[30] Foreign Application Priority Data

Sep. 6, 1988 [JP] Japan .............................. 63-224116

[51] Int. Cl.$^5$ .............................................. H04N 3/14
[52] U.S. Cl. ............................ 358/213.31; 358/213.29
[58] Field of Search ...................... 358/213.26, 213.29, 358/213.11, 213.31

[56] References Cited

U.S. PATENT DOCUMENTS

| | | | |
|---|---|---|---|
| 4,750,057 | 6/1988 | Baumeister | 358/213.26 |
| 4,845,568 | 7/1989 | Hieda et al. | 358/213.26 |
| 4,907,089 | 3/1990 | Yamaguchi et al. | 358/213.26 |

FOREIGN PATENT DOCUMENTS 63-1263  1/1988  Japan .

*Primary Examiner*—Stephen Brinich
*Attorney, Agent, or Firm*—Burns, Doane, Swecker & Mathis

[57] ABSTRACT

An apparatus for driving a solid-state image pickup device for optimizing the transmission timing of a driving signal to be supplied to the image pickup element for adjusting the timing for sample and hold of an output signal from the image pickup element or the like is disclosed which employs a shift register for shifting the driving signal to be supplied to the image pickup element using a clock signal having a relatively shorter period than the period of the driving signal and outputting at its plural stages the driving signals provided with different delay times in increments of one period of the clock signal, and a selection means for selecting a driving signal provided with a desired delay time out of the output signals at the plural stages of the shift register and supplying the selected output signal to the image pickup element, whereby the driving signal can be transmitted at the optimum timing so that the adjustment of the delay time is preformed accurately within a wide range, the shift register can be provided simply and economically, and thus, an apparatus for driving a solid-state image pickup device excellent in that it is economical and requires only a small mount space can be obtained.

3 Claims, 3 Drawing Sheets

VARIABLE-DELAY SIGNAL GENERATING APPARATUS FOR DRIVING SOLID-STATE IMAGE PICK-UP DEVICE

BACKGROUND OF THE INVENTION

1. Field of the Invention

The present invention relates to an apparatus for driving a solid-state image pickup device suitable for optimizing the timing for transmission of a drive signal to be supplied to a solid state image pickup element for adjusting the timing for performing a sample-and-hold operation on an output signal from a device such as a solid-state image pickup element.

2. Description of the Prior Art

FIG. 1 is a block diagram showing prior art apparatus for driving a solid-state image pickup device disclosed, for example, in Japanese Laid-open Patent Publication No. 63-1263. Referring to the figure, reference numeral 1 denotes a solid-state image pickup element for converting a light image incident on its element surface through a lens 2 into an electric signal to be output therefrom, 3 denotes a video signal processing circuit for performing such a process as sample and hold on an output signal from the solid-state image pickup element 1 to obtain a continuous signal and converting the obtained signal into an ordinary video signal to be output therefrom, 4 denotes a pulse generator for generating pulse signals such as that which derives the solid-state image pickup element 1, 6 and 7 denote delay lines for adjusting the timing of the drive signals from the pulse generator 4, 8 and 9 denote drivers for output pulses from the delay lines 6, 7, respectively, 11 and 12 denote pulse drivers for amplifying signals from the pulse generator 4 and delivering the amplified signals to the solid-state image pickup element 1, 10 denotes a buffer amplifier for amplifying a signal output from the solid-state image pickup element 1, in response to the driving signal from the pulse generator 4 passed through the pulse drivers 11, 12 and driving signals from the drivers 8, 9, and supplying the amplified signal to the video signal processing circuit 3, and 5 denotes a monitor television for displaying a video signal from the video signal processing circuit 3.

Operation of the described arrangement will be described below.

The lens 2 focuses an image of an object, not shown, on the element surface of the solid-state image pickup element 1 and this light image is converted into electric charges to be accumulated within the solid-state image pickup element 1. The accumulated charges are transferred to shift register, not shown, within the solid-state image pickup element 1 responding to driving signals generated by the pulse generator 4 and supplied thereto through the pulse drivers 11, 12, and these charges are read to the outside being converted into a voltage signal in synchronism with driving signals generated by the pulse generator 4, subjected to delay adjustments in the delay lines 6, 7, and supplied thereto through the drivers 8, 9. The signal read out of the solid-state image pickup element 1 is input through the buffer amplifier 10 to the video signal processing circuit 3, and therein, the signal is subjected to such processes as sample and hold to be converted into a continuous signal and then into an ordinary video signal. The thus obtained video signal is output to the monitor television 5 and displayed as a video image for viewing.

Since the prior art apparatus for driving solid-state image pickup device is arranged as described above, in order to adjustment the timing for the sample-and-hold process of the signal read out form the solid-state image pickup element 1, it is practiced, in the delay lines 6, 7, to delay and adjust the timing of the driving signals for the signal reading supplied from the pulse generator 4 to the solid-state image pickup element 1. However, since the delay lines 6, 7 are elements being rather expensive, and further, peripheral circuits such as a TTL interface are required for the driving, there have been such problems that the circuit becomes large in scale and requires a large mount space, and further, it is difficult to make delicate timing adjustments since the adjustable range of the delay time is small.

SUMMARY OF THE INVENTION

An object of the present invention is to provide an apparatus for driving a solid-state image pickup device, in which the delay control means itself is low in cost, simply mountable, occupying a small mount space, and requiring no peripheral circuits, and therefore is excellent in its economic aspects.

Another object of the present invention is to provide an apparatus for driving a solid-state image pickup device giving a wide adjustable range of the delay time and enabling fine timing adjustments, so that an excellent video signal can be obtained from the solid-state image pickup element.

The above and other objects and features of the present invention will become more fully understood by reading the following detailed description with reference to the accompanying drawings. The drawings, however, are that which are principally given by way of illustration only and thus are not limitative of the scope of the present invention.

In order to achieve the above mentioned objects, the apparatus for driving a solid-state image pickup device according to the present invention comprises a signal generating means for generating a driving pulse signal to be supplied to the solid-state image pickup element, electrically converting a light image focused on the element surface, to read the converted output signal therefrom, a video signal processing means for subjecting the output signal from the solid-state image pickup element to such processes as sample and hold to thereby convert it to a video signal, a shift register for shifting the driving signal to be supplied to the solid-state image pickup element using a clock signal having a relatively shorter period than the period of the pulse signal and outputting the driving signals provided with different delay times in increments of one period of the clock signal at its plural stages, and a selecting means for selecting a driving signal with a desired delay time out of the output signal at the plural stages of the shift register thereby supplying the selected signal to the solid-state image pickup element, whereby processing of the signal from the solid-state image pickup element and timing of the signal to be supplied to the converting means are made adjustable.

Thus, the apparatus for driving a solid-state image pickup device according to the present invention delays the driving signal to be supplied to the solid-state image pickup element in increments of one clock period, so that a driving signal having a desired delay time can be selected from the delayed driving signals, and thereby, the timing of the signal read out from the solid-state image pickup element can be adapted for processing in the processing means.

DETAILED DESCRIPTION OF THE PREFERRED EMBODIMENTS

A preferred embodiment of the present invention will be described below in detail with reference to the accompanying drawings.

Figure 1:
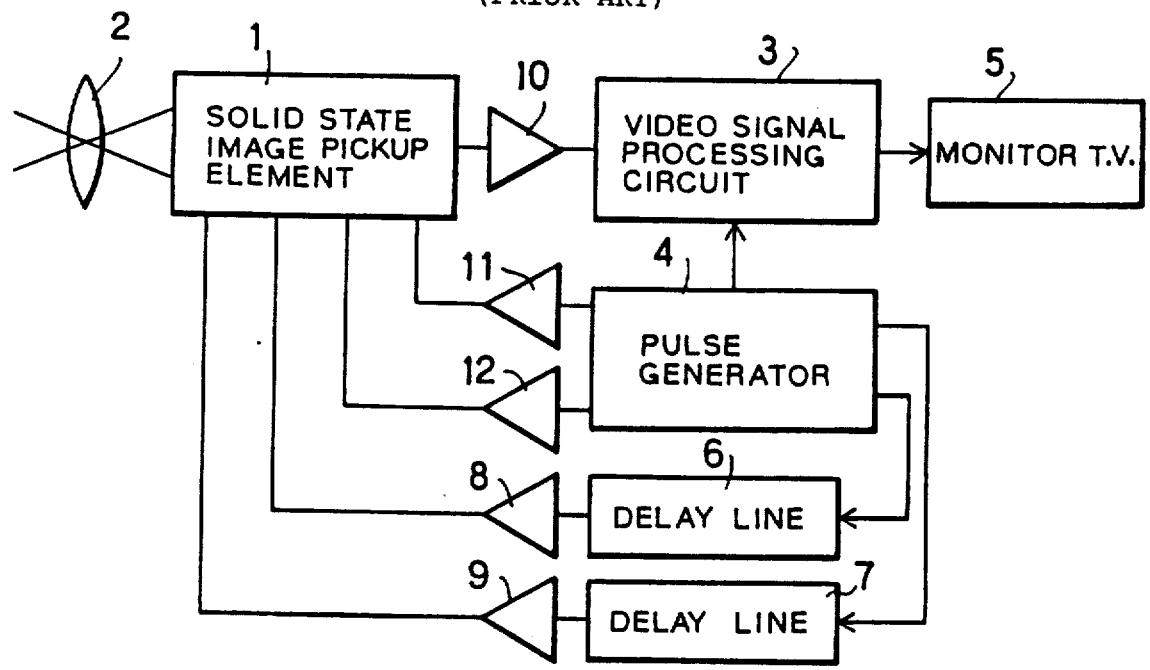
FIG. 1 is a block diagram of an apparatus for driving a solid-state image pickup device of the prior art.
Figure 2:
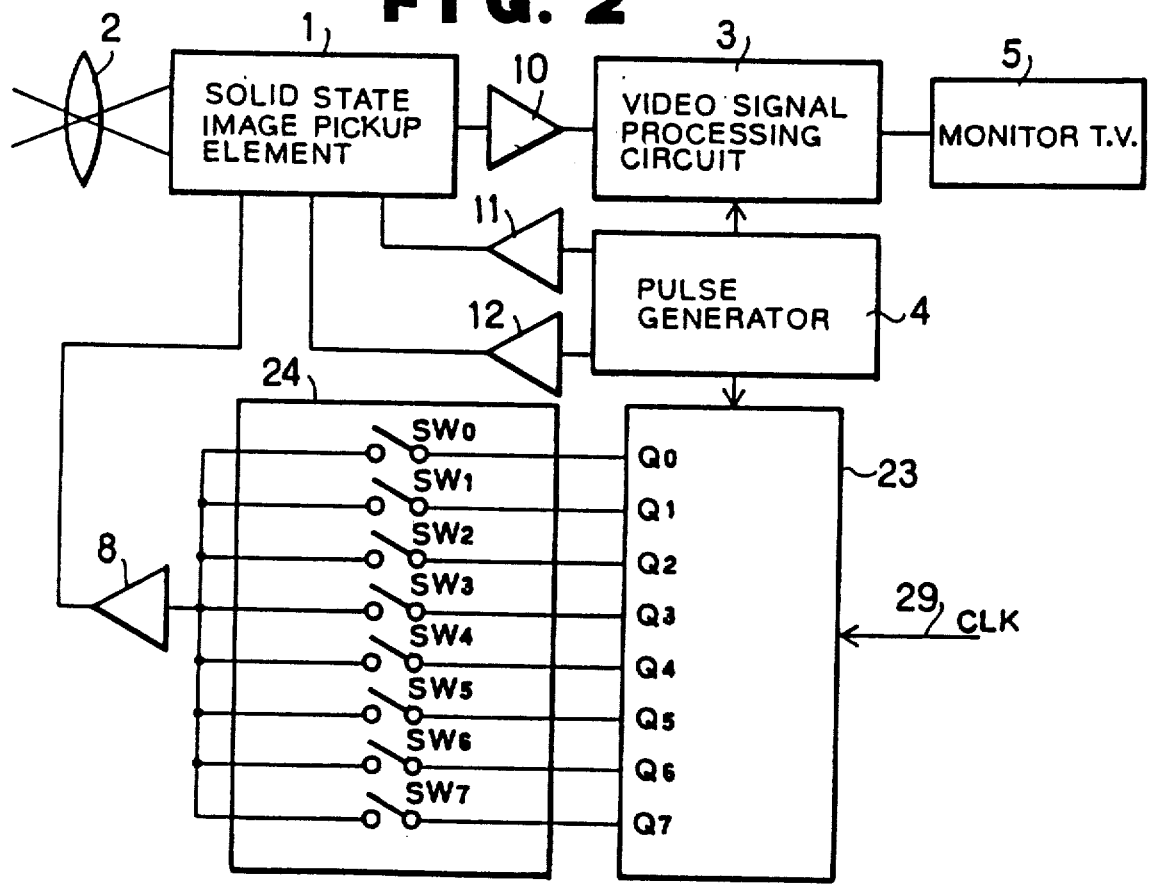
FIG. 2 is a block diagram showing an apparatus for driving a solid-state image pickup device according to an embodiment of the present invention.

FIG. 2 is a block diagram of an apparatus for driving a solid-state image pickup device according to an embodiment of the present invention, in which reference numeral 23 denotes a shift register for shifting the driving signal supplied thereto from the pulse generator 4 and to be supplied therefrom to the solid-state image pickup element 1 in synchronism with a clock signal CLK incoming from a high-frequency clock input line 29 and outputting the delayed driving signals at each shift stage at its output terminals $Q_0$–$Q_7$, and reference numeral 24 denotes a selector for selecting the output signals at the output terminals $Q_0$–$Q_7$ of the shift register 23 by means of its selector contacts $SW_0$–$SW_7$ and supplying the selected signal to the solid-state image pickup element 1 through the pulse driver 8.

Operation in the above described arrangement will be described below.

When an image of an object, not shown, is focused on the element surface of the solid-state image pickup element 1, the light image is converted into electric charges and accumulated in the solid-state image pickup element 1. The accumulated electric charges are transferred, in response to driving signals supplied from the pulse generator 4 through the pulse drivers 11, 12, to a shift register, not shown within the solid-state image pickup element 1.

Figure 3:
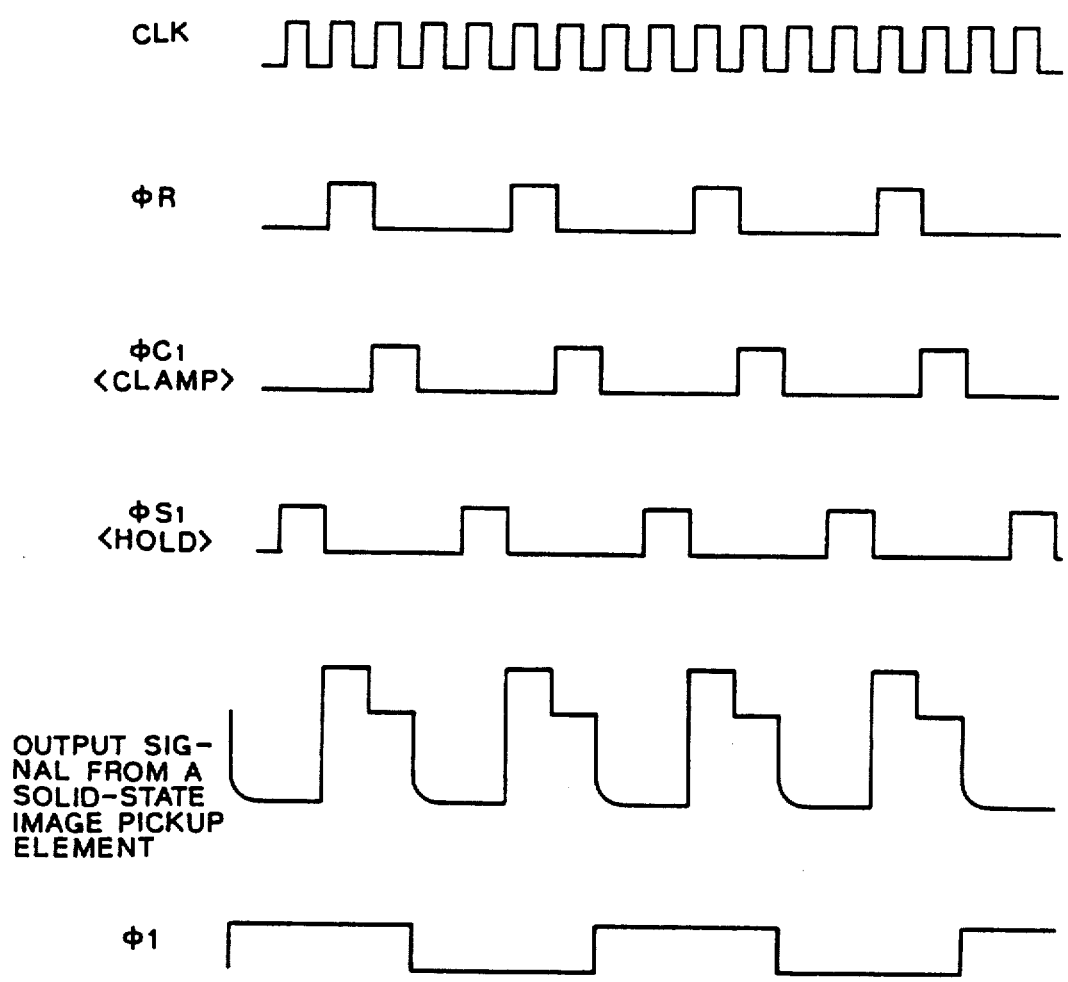
FIG. 3 is a time chart for explaining operation of the apparatus for driving a solid-state image pickup device of FIG. 2.

Meanwhile, the shift register in the solid-state image pickup element 1 is supplied with driving pulse signals $\phi_R$, $\phi_I$ as shown in FIG. 3, whereby the electric charge signal is converted into a voltage signal in synchronism with these pulse signals and read to the outside.

Now, for the electric charges transferred to the shift register within the solid-state image pickup element by the driving signals from the pulse drivers 11, 12 to be read out as the signal of the desired image information itself brought, by a clamp $\phi_{C1}$ and a hold $\phi_{S1}$, to the state of it capable of being subjected to the sample-and-hold process, a very small quantity of latency time is required. Therefore, as the driving pulse signals $\phi_R, \phi_I$, such signals that are obtained by delaying adjustment of the driving signal generated by the pulse generator 4 are used. More particularly, a clock signal CLK of much shorter period than the period of the driving signal for the solid-state image pickup element 1 is supplied from the high-frequency clock input line 29 to the shift register 23, and therein, the driving signal generated by the pulse generator 4 is delayed by the times in increments of one clock period of the clock signal CLK. Then driving signals with different delay times appearing at the output terminal $Q_0$–$Q_7$ of the shift register 23 are selected by selectively turning on the selector contacts $SW_0$–$SW_7$ of the selector 24, and the selected signal is supplied to the solid-state image pickup element 1 through the driver 8, and thereby, a signal can be read out from the solid-state image pickup element 1 according to the driving signal with the desired delay time.

The signal read out of the solid-state image pickup element 1 is input through the buffer amplifier 10 to the video signal processing circuit 3, and therein, it is subjected to such processes as sample and hold to be converted into a continuous signal, and thereupon, it is processed into an ordinary video signal. The thus obtained video signal is output to the monitor television 5 so as to be viewed as a video image.

Figure 4:
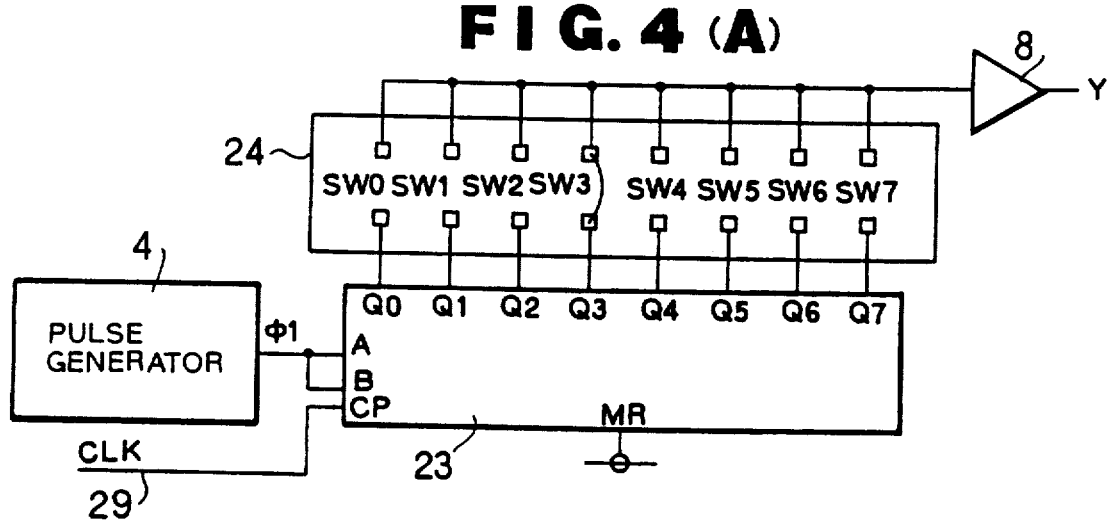
FIGS. 4 (A), (B) is an explanatory drawing of operation of a delay control means.
Figure 4:
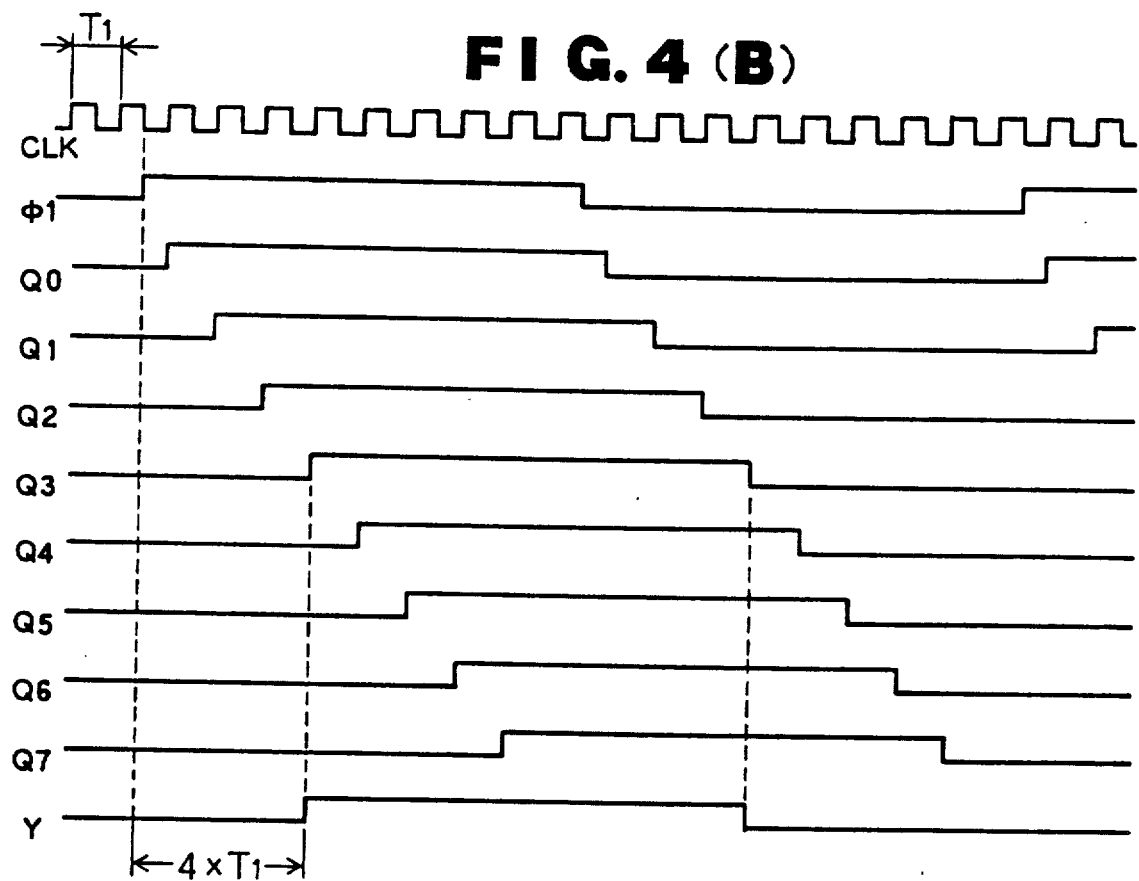

Now, representing the period of the clock signal CLK supplied from the high-frequency clock input line 29 to the shift register 23 by $T_1$, the delay time can be selected, as shown in FIG. 4, from the range between $T_1$ and $8 \times T_1$, in increments of $T_1$. The delay times of the driving signals obtained from the output terminal $Q_0$–$Q_7$ of the shift register 23 are given by $T_1, 2 \times T_1, 3 \times T_1, \ldots, 8 \times T_1$, and each of which can be taken out by selectively turning on the selector contacts $SW_0$–$SW_7$ of the selector 24. In the case shown in FIG. 4, $SW_3$ is selected to be turned on. The pulse signal $\phi_1$ from the pulse generator 4 is output with the delay time four times the period of the clock signal CLK supplied to the shift register 23, $T_1 \times 4 = 4T_1$. That is, the output signal Y is $4 \times T_1$ delayed from $\phi_1$.

By performing the above described operation, the delicate delay of the timing of the read signal depending on the distance and the transmission line characteristic between the pulse generator 4 and the solid-state image pickup element 1, and the distance and the transmission line characteristic between the solid-state image pickup element 1 and the video signal processing circuit 3, and the timing in the process such as sample and hold of the read out signal in the video signal processing circuit 3 can be compensated for by selective switching of the selector contacts $SW_0$–$SW_7$ of the selector 24. In most cases, the delay time of the signal is minutely varied from apparatus to apparatus, but by adjusting it in increments of $T_1$ as described above, the compensation is made possible to bring about a favorable condition. Further, the shift register 23 can be structured of a simple TTL shift register, and this brings about a great advantage over the conventional delay line in the points of cost and mount space. It is possible to obtain a still finer delay time by adjusting or selecting the frequency of the high-frequency clock signal CLK supplied from the outside through the high-frequency clock input line 29 to the shift register 23.

According to the present invention as described so far, the driving signal of the solid-state image pickup element is adapted to be provided with a desired delay time by delaying the signal be means of a simple shift register and selecting an output from plural stages of the shift register, and therefore, the effect is obtained that an apparatus for driving a solid-state image pickup device can be provided which is excellent in that it is economical and needs only small mount space, and yet, capable of adjusting the delay time accurately simply, and within a wide range.

What is claimed is:

1. An apparatus for driving a solid-state image pickup device comprising:

signal generating means for generating a driving signal to be supplied to the solid-state image pickup element, electrically converting a light image, to read the converted output signal therefrom;

video signal processing means for processing the output signal from the solid-state image pickup element to convert it to a video signal;

a shift register for shifting the driving signal to be supplied to the solid-state image pickup element using a clock signal having a shorter period than the period of the driving signal and outputting the driving signal with different delay times at its plural stages; and selecting means for selecting a driving signal with a desired delay time out of the output signal at the plural stages of the shift register to supply the selected signal to the solid-state image pickup element.

2. An apparatus for driving a solid-state image pickup device according to claim 1, wherein said signal generating means is a pulse signal generator for generating a pulse signal.

3. An apparatus for driving a solid-state image pickup device according to claim 1 or 2, wherein said shift register is structured of a TTL IC.

* * * * *